United States Patent
Kim et al.

(10) Patent No.: US 9,120,463 B2
(45) Date of Patent: Sep. 1, 2015

(54) FLAT WIPER BLADE AND FLAT WIPER BLADE ASSEMBLY

(71) Applicant: KCW Corporation, Daegu-si (KR)

(72) Inventors: Tae Kyeong Kim, Daegu-si (KR); Kwan Hee Kim, Daegu-si (KR); Jae Hyuck An, Daegu-si (KR); Jin Wan Park, Daegu-si (KR)

(73) Assignee: KCW CORPORATION, Daegu (KR)

( * ) Notice: Subject to any disclaimer, the term of this patent is extended or adjusted under 35 U.S.C. 154(b) by 212 days.

(21) Appl. No.: 13/749,063

(22) Filed: Jan. 24, 2013

(65) Prior Publication Data

US 2013/0192016 A1    Aug. 1, 2013

(30) Foreign Application Priority Data

Jan. 27, 2012   (KR) .................. 10-2012-0008180

(51) Int. Cl.
 *B60S 1/38* (2006.01)
 *B60S 1/40* (2006.01)
 *B60S 1/04* (2006.01)

(52) U.S. Cl.
 CPC ............... *B60S 1/0408* (2013.01); *B60S 1/387* (2013.01); *B60S 1/3858* (2013.01); *B60S 1/4003* (2013.01); *B60S 1/381* (2013.01); *B60S 1/3853* (2013.01); *B60S 1/3881* (2013.01); *B60S 1/3886* (2013.01); *B60S 1/407* (2013.01); *B60S 2001/408* (2013.01); *B60S 2001/4022* (2013.01); *B60S 2001/4051* (2013.01); *B60S 2001/4058* (2013.01)

(58) Field of Classification Search
 CPC .... B60S 1/4006; B60S 1/3858; B60S 1/3881; B60S 1/4009; B60S 1/4016; B60S 1/4019; B60S 1/3849–1/3856

USPC ............. 15/250.44–250.48, 250.201, 250.32
See application file for complete search history.

(56) References Cited

U.S. PATENT DOCUMENTS

| | | | |
|---|---|---|---|
| 7,587,783 B1 | 9/2009 | Lin | |
| 2003/0213089 A1* | 11/2003 | Merkel et al. | 15/250.32 |
| 2008/0148509 A1* | 6/2008 | Bacarella et al. | 15/250.32 |
| 2008/0201894 A1* | 8/2008 | Ko | 15/250.201 |
| 2008/0235896 A1 | 10/2008 | Cheng | |
| 2011/0041280 A1* | 2/2011 | Choi et al. | 15/250.361 |
| 2013/0117957 A1* | 5/2013 | Ku | 15/250.201 |

FOREIGN PATENT DOCUMENTS

| | | |
|---|---|---|
| CA | 2617013 A1 | 11/2008 |
| CN | 101624043 A | 1/2010 |
| CN | 101674962 A | 3/2010 |

(Continued)

OTHER PUBLICATIONS

Chinese Office Action, Chinese Application No. 201310028948.3, Oct. 16, 2014, 9 pages (with concise explanation of relevance).

*Primary Examiner* — Mark Spisich
*Assistant Examiner* — Andrew A Horton
(74) *Attorney, Agent, or Firm* — Fenwick & West LLP

(57) ABSTRACT

Disclosed are a flat wiper blade 2 and a flat wiper blade assembly. The flat wiper blade according to an embodiment of the present invention includes: a wiper strip 10 which wipes a wiping surface; a frame 30 which supports the wiper strip 10; a first and a second spoilers 41 and 42 which are coupled to the frame 30; and a seating part 100 to which adaptor parts 3 and 4 coupled to a wiper arm are coupled and which is coupled to the frame 30 in an attachable and removable manner.

15 Claims, 14 Drawing Sheets

(56) References Cited

FOREIGN PATENT DOCUMENTS

| CN | 102149582 | A | 8/2011 |
|---|---|---|---|
| EP | 1995130 | A2 | 11/2008 |
| KR | 100692371 | B1 | 3/2007 |
| KR | 100891195 | B1 | 4/2009 |
| KR | 100903374 | B1 | 6/2009 |
| KR | 1020110000855 | A | 1/2011 |

* cited by examiner

FLAT WIPER BLADE AND FLAT WIPER BLADE ASSEMBLY

BACKGROUND

1. Field

The present invention relates to a flat wiper blade and a flat wiper blade assembly, and more particularly to a general wiper blade which is connected to wiper arms having mutually different specifications and shapes according to the kind of a vehicle, and a general wiper blade assembly.

2. Description of Related Art

In general, a wiper blade removes impurities, snow, rain or the like when driving and prevents a driver's front sight from being deteriorated and performs a repetitive reciprocating action in a fan shape as a motor drives a link apparatus connected to a wiper arm.

The wiper blade includes a long wiper strip contacting with a glass surface and a frame maintaining and supporting the wiper strip in a longitudinal direction of the wiper strip. The wiper blade including the frame is known as a conventional wiper blade in the art. Recently, a wiper blade is being employed which makes use of one frame curved at a predetermined curvature and formed in the form of a long thin bar. Such a wiper blade is known as a flat wiper blade or a flat-bar wiper blade in the art. As compared with the conventional wiper blade, the flat wiper blade has a less height and receives less air resistance. With a uniform load, the flat wiper blade is also able to cause the wiper strip to contact with the glass surface. The flat wiper blade is connected to the wiper arm such that a connection unit formed in the central portion of the frame of the flat wiper blade is connected saparably to the end portion of the wiper arm.

The conventional wiper arm for a vehicle, that is, the conventional driving arm for a vehicle is largely classified into a "U" shaped clip type having a catching structure, a bayonet type fitted as a plug type, a pin type forming a protrusion in a side portion and taking a fitting structure by the protrusion, a side hole type performing a fitting coupling in a side portion of a wiper apparatus, developed by a Bosch corporation, and a top-lock type performing a coupling by a covering structure in an upper portion of the wiper apparatus, and the various types of driving arms have a limitation in that they can use only dedicated wiper apparatuses since their shapes and sizes are different from other.

Accordingly, product standardization for the wiper device is difficult to achieve, and thus the flexibility of product design is reduced. Moreover, since wiper blades which correspond to a variety of the wiper arms respectively should be manufactured, the time and cost required for manufacturing the wiper blades are increased.

SUMMARY

One embodiment is a flat wiper blade including: a wiper strip 10 which wipes a wiping surface; a frame 30 which supports the wiper strip 10; a first and a second spoilers 41 and 42 which are coupled to the frame 30; and a seating part 100 to which adaptor parts 3 and 4 coupled to a wiper arm are coupled and which is coupled to the frame 30 in an attachable and removable manner.

At least two catching holes 34 are formed in the frame 30 at a predetermined interval. A fitting recess 33 concave in the widthwise direction of the wiper blade is formed in the longitudinal direction sides of the frame 30. The seating part 100 includes a fitting protrusion 110 which is inserted and fitted into the fitting recess 33 of the frame 30 and an elastic catcher 120 which is inserted and fitted into the catching hole 34.

The fitting protrusion 110 is inserted and fixed to the fitting recess 33, so that the frame 30 and the seating part 100 come in close contact with each other. The frame 30 and the seating part 100 slide in an opposite direction to each other in the longitudinal direction of the wiper blade, and then are coupled to each other.

The seating part 100 further includes a side 150 surrounding both sides of a portion of the frame 30.

The adaptor parts 3 and 4 include catching projections 210 and 211 and adaptor catchers 240 and 241. The seating part 100 includes a catching recess 130 to which the catching projections 210 and 211 of the adaptor parts 3 and 4 are inserted and fitted and a catching protrusion 140 by which the catchers 240 and 241 are caught.

The catching projections 210 and 211 are inserted and fitted to the catching recess 130. The seating part 100 and the adaptor parts 3 and 4 slide in an opposite direction to each other in the longitudinal direction of the wiper blade, and then the adaptor catchers 240 and 241 are caught by the catching protrusion 140, so that the adaptor 200 and the seating part 100 are coupled to each other.

Another embodiment is a flat wiper blade assembly including: the flat wiper blade 2 and an adaptor part 3 including: an adaptor 200 coupled to the seating part 100; and a connector 300 coupled to the adaptor 200 and fastens the wiper arm to the wiper blade 2. The adaptor 200 includes: a catching projection 210 which is formed in the lower portion of the adaptor 200 and is inserted and fixed into the seating part 100; a pair of guide plates 220 which is formed in the upper portion of the adaptor 200 and projects perpendicularly at a predetermined interval; and a hinge recess 230 which is formed in the upper portion of the guide plate 220. The connector 300 comprises a body 320 and a cover part 310. The body 320 which includes: coupling parts 330 and 340 which are formed on both sides of the body 320 and receive a catching protrusion of the wiper arm; and a hinge shaft which is formed in the lower portion of the body 320 and is inserted and fixed to the hinge recess 230 of the adaptor 200. The cover part 310 restricts forward and backward movements or up and down movements of the wiper arm.

The adaptor 200 further includes an adaptor catcher 240 preventing the adaptor 200 from being separated from the seating part 100. The seating part 100 includes a catching recess 130 to which the catching projection 210 of the adaptor 200 is inserted and fitted and a catching protrusion 140 by which the adaptor catcher 240 is caught.

The catching projection 210 is inserted and fitted to the catching recess 130. The seating part 100 and the adaptor 200 slide in an opposite direction to each other in the longitudinal direction of the wiper blade 2, and then the adaptor catcher 240 is caught by the catching protrusion 140, so that the adaptor 200 and the seating part 100 are coupled to each other.

The cover part 310 includes at least one catching recess 363 formed in a side thereof. The body 320 further includes at least one elastic catching piece 362 which is coupled to the catching recess 363.

The body 320 further includes a guide part 361 guides a straight line movement of the cover part 310.

The body 320 further includes a coupling recess 364 which is formed in a side thereof and to which the cover part 310 is coupled. The cover part 310 further includes a pair of coupling protrusions 365 formed therein. The coupling protrusion 365 is coupled to the coupling recess 364, guides a straight line movement of the cover part 310 and functions as a rotation axis when the cover part 310 rotates.

The body 320 further includes a pair of slit grooves 354 formed in a lower portion thereof.

The connector 300 is connected to a wiper arm (ta) including a tap which contacts with the top surface and both sides of the connector 300 and extends toward the cover part 310, or is connected to a wiper arm (ca) including a cap which contacts with the top surface and both sides of the connector 300.

Further another embodiment is a flat wiper blade assembly including: the flat wiper blade 2 and an adaptor part 4 including: an adaptor 201 coupled to the seating part 100; and a connector 301 coupled to the adaptor 201 and fastens the wiper arm to the wiper blade 2. The adaptor 201 includes: a catching projection 211 which is formed in the lower portion of the adaptor 201 and is inserted and fixed into the seating part 100; a pair of outer side plates 221 which is formed in the upper portion of the adaptor 201 and projects perpendicularly at a predetermined interval; and a hinge shaft 231 which connects the central portions of the outer side plates 221. The connector 301 includes: a pair of inner side plates 321, a hinge recess 351 and a curved surface 331. A pair of inner side plates 321 contacts with a pair of the outer side plates 221. The hinge recess 351 is formed in the central portion of the inner side plate 321 and is inserted and fixed to the hinge shaft 231. A wiper arm (ha) having a straight portion and a curved portion which is formed on an end of the wiper arm and extends from the straight portion is selectively caught by the curved surface 331. The connector 301 is inserted between the outer side plates 221 of the adaptor 201 and is pivoted.

The adaptor 201 further includes an adaptor catcher 241 preventing the adaptor 201 from being separated from the seating part 100. The seating part 100 includes a catching recess 130 to which the catching projection 211 of the adaptor 201 is inserted and fitted and a catching protrusion 140 by which the adaptor catcher 241 is caught.

The catching projection 211 is inserted and fitted to the catching recess 130. The seating part 100 and the adaptor 201 slide in an opposite direction to each other in the longitudinal direction of the wiper blade 2, and then the adaptor catcher 241 is caught by the catching protrusion 140, so that the adaptor 201 and the seating part 100 are coupled to each other.

DETAILED DESCRIPTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Figure 1:
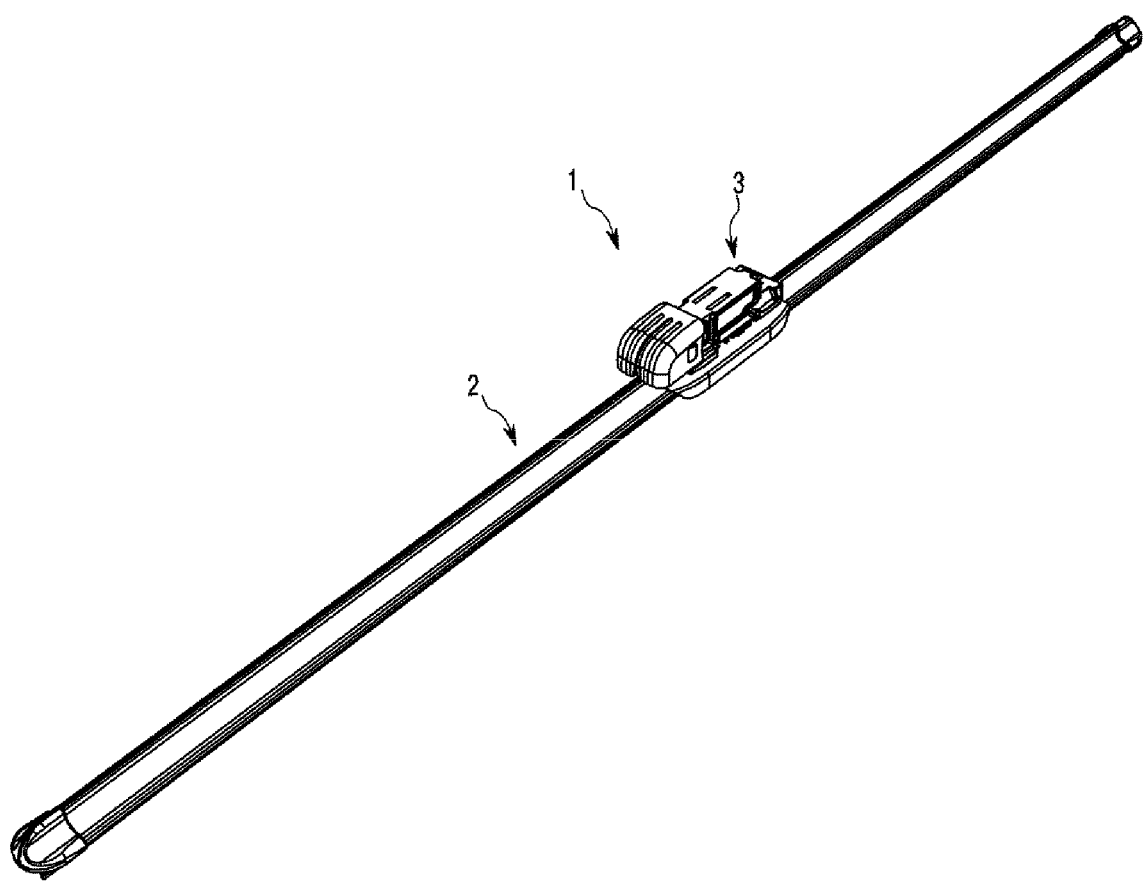
FIG. 1 is a perspective view showing an overall configuration of a flat wiper blade assembly according to an embodiment of the present invention.

Overall Configuration of a Wiper Blade Assembly According to the Present Invention FIG. 1 is a perspective view showing a flat wiper blade assembly according to an embodiment of the present invention.

Figure 2:
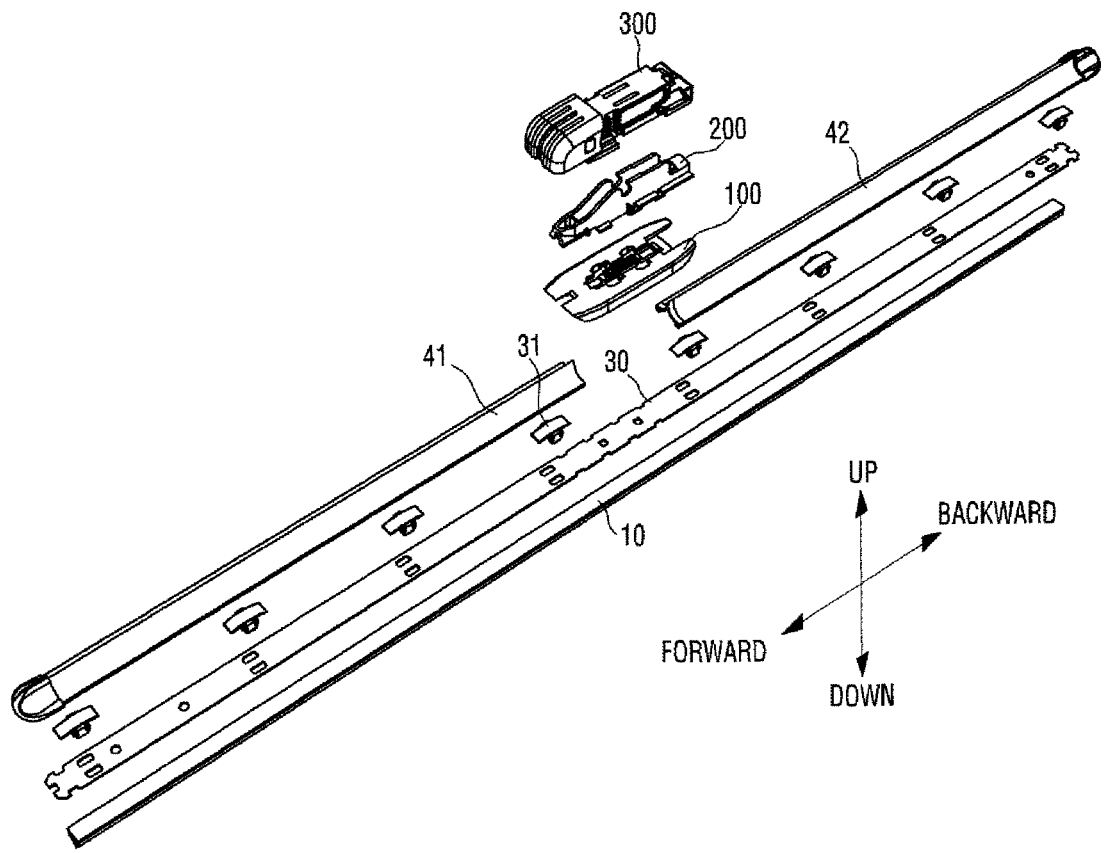
FIG. 2 is an exploded perspective view showing the flat wiper blade assembly according to the embodiment of the present invention.

FIG. 2 shows that a flat wiper blade and an adaptor part have been separated from each other according to the embodiment of the present invention.

Figure 3A:
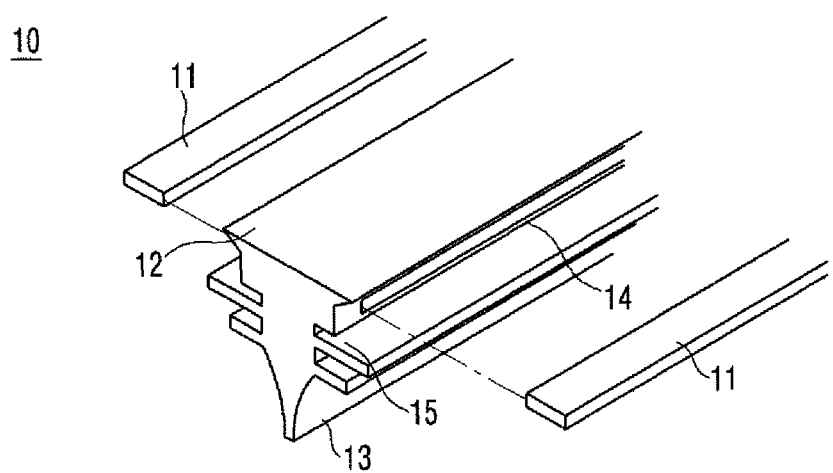
FIG. 3a is a perspective view showing one end of a flat wiper strip according to the embodiment of the present invention.
Figure 3B:
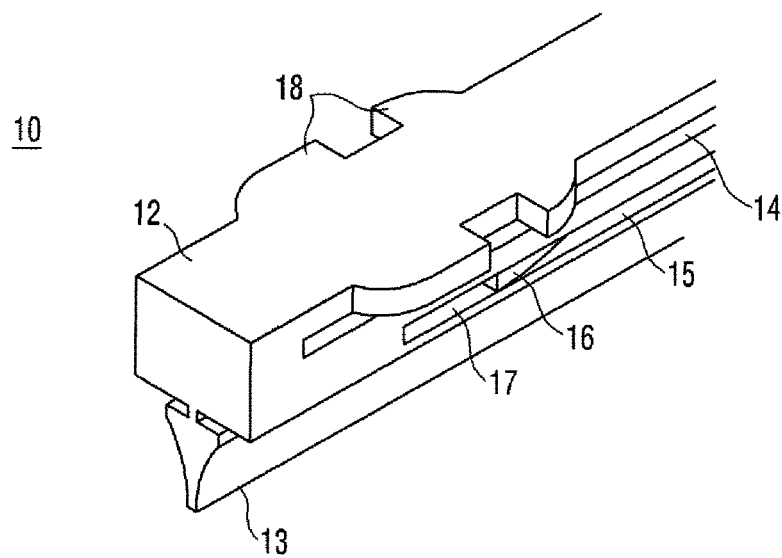
FIG. 3b is a perspective view showing the other end of the flat wiper strip according to the embodiment of the present invention.

FIGS. 3a and 3b are partial perspective views showing one end and the other end of a wiper strip 600 respectively.

Referring to FIGS. 1 and 2, the flat wiper blade assembly 1 according to the present invention includes a flat wiper blade 2 contacting closely with a glass surface of a vehicle, and an adaptor part 3 which is assembled to a middle portion of the flat wiper blade 2 for the purpose of connecting a wiper arm to the flat wiper blade 2.

The flat wiper blade 2 includes a wiper strip 10 contacting closely with the glass surface of the vehicle and wiping the glass surface of the vehicle, a frame 30 supporting the wiper strip 10, a first and a second spoilers 41 and 42 which are coupled to the frame 30, and a seating part 100 for coupling the adaptor part 3 to the frame 30.

The adaptor part 3 includes an adaptor 200 and a connector 300. The adaptor 200 is coupled to the seating part 100 of the flat wiper blade 2. The connector 300 is coupled to the adaptor 200 and fastens the wiper arm to the wiper blade 2.

Hereafter, the flat wiper blade shown in FIGS. 1 and 2 will be described in detail.

The flat wiper blade 2 is connected to the front end of the wiper arm (not shown) and is pressurized by the wiper arm with respect to the glass surface of the vehicle. The wiper arm rotates reciprocatively at a predetermined angle by a wiper motor (not shown). Accordingly, the flat wiper blade 2 wipes the glass surface (wiping surface) of the vehicle within the predetermined angle.

FIGS. 3a and 3b are partial perspective views showing one end and the other end of a wiper strip 10 respectively.

As shown in FIGS. 1, 2, 3a and 3b, the flat wiper blade 2 may further include two baking plates 11 mounted on the wiper strip 10.

Referring to FIGS. 1, 2, 3a and 3b, the wiper strip 10 includes a wiping lip 13 and a base 12. The wiping lip 13 contacts directly with and wipes the glass surface. The base 12 is supported by the frame 30. The wiper strip 10 is disposed to contact directly with the glass of the vehicle in a sliding manner and removes impurities of the glass surface. The wiper strip 10 extends in a longitudinal direction thereof and is made of an elastic material like a rubber material or made of an elastic composite material.

The base 12 is supported by a fastener 31 of the frame 30. The fastener 31 may have a yoke shape. The base 12 and the wiping lip 13 continuously extend in a longitudinal direction of the wiper strip 10. A receiving recess 14 in which the two parallel baking plates may be received extends in the base 12 in a longitudinal direction thereof. The two rectangular metallic baking plates 11 having spring characteristics are received in the two baking plate receiving recesses 14 respectively. A holding portion 15 receives the fastener 31 in a sliding manner.

As shown in FIG. 3a, the holding portion 15 at the one end of the wiper strip 10 is open so as to receive the fastener 31. However, as shown in FIG. 3b, the other end of the wiper strip is formed to limit the longitudinal direction movement of the fastener 31. That is, one of the fasteners 31 of the frame 30, which is located at one end of the wiper strip 10, is limited by a coupler 17 and a wall of a slope 16 provided only at the other end of the holding portion 15. Also, the longitudinal direction movement of the fastener 31 is limited by a protrusion 18.

The baking plate 11 applies elasticity and rigidity to the wiping lip 13. When a pressurizing force is applied from the wiper arm, the pressurizing force is distributed to the wiper strip 10 through the frame 30. Here, the pressurizing force is distributed by the baking plate 11 in the longitudinal direction of the wiper strip 10. Accordingly, the baking plate 11 should have elasticity and rigidity to maintain the shape of the wiper strip 10. A plurality of the baking plates 11 and a plurality of the baking plate receiving recesses 14 may be provided according to the rigidity or elasticity of the wiper strip.

An embodiment of the flat wiper blade and the wiper blade assembly according to the present invention will be described.

Figure 4:
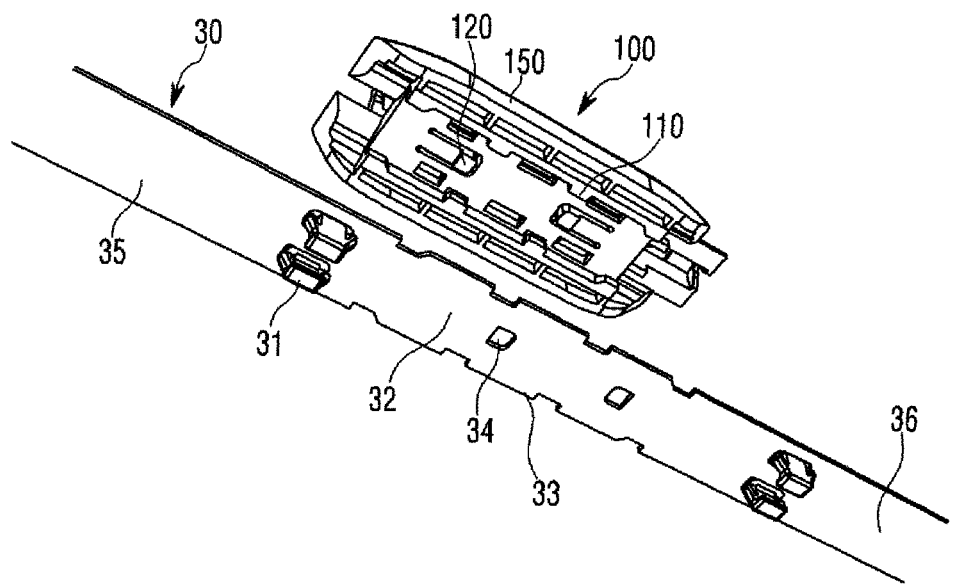
FIG. 4 is a bottom view showing a frame and a seating part of a flat wiper blade according to the embodiment of the present invention.

An Embodiment of the Adaptor Part and Seating Part in the Wiper Blade Assembly According to the Present Invention FIG. 4 shows that the flat wiper blade and the seating part have been separated from each other according to the present invention.

Referring to FIGS. 2 and 4, the frame 30 has a long thin shape in the major axial direction of the wiper blade 2 and includes a first and a second sides 35 and 36 which are located on both ends thereof, and a central portion 32 located approximately in the center between the first and the second sides 35 and 36. The first and the second spoilers 41 and 42 are coupled to the first and the second sides 35 and 36 respectively. The seating part 100 is coupled to the central portion 32 in an attachable and removable manner. Recesses are formed in the first and the second sides 35 and 36 at a predetermined interval, so that the fastener 31 can be inserted and fixed into the recess from the top surface to the bottom surface of the frame 30. However, the separate fastener 31 is not necessarily inserted and fixed into the recess. The fastener 31 may be integrally formed with the frame 30.

A fitting recess 33 concave in the widthwise direction of the wiper blade 2 is formed in a portion of the longitudinal direction sides of the frame 30. At least two catching holes 34 are formed in the approximately central portion in the widthwise direction of the frame at a predetermined interval in the longitudinal direction of the frame 30. The fitting recess 33 and the catching hole 34 are approximately located in the central portion 32 of the frame 30.

Meanwhile, the seating part 100 is coupled to the frame 30.

The seating part 100 connects the frame 30 with the adaptor part 3. The bottom surface of the seating part 100 contacts with the frame 30. The top surface of the seating part 100 contacts with the adaptor part 3.

A fitting protrusion 110 protrudes in the lower portion of the seating part 100 in the width direction of the seating part 100. The fitting protrusion 110 is engaged with and fitted to the fitting recess 33 of the frame 30. A pair of elastic catchers 120 inserted and fitted into the catching hole 34 of the frame 30 is formed in the approximately central portion in the widthwise direction of the seating part 100 at a predetermined interval. It is recommended that an interval between both sides 150 of the seating part 100 should be greater than the width of the central portion 32 of the frame such that the both sides 150 surround a portion of the central portion 32 of the frame, and the thicknesses of the both sides 150 should be larger than that of the frame 30. A distance between the mutually facing fitting protrusions 110 is less than the width of the central portion 32 of the frame. The size of the fitting recess 33 of the frame 30 may be larger than that of the fitting protrusion 110 of the seating part 100. A suppressing force of the separation of the frame 30 and the seating part 100 is increased with the decrease of a size difference between the fitting recess 33 and the fitting protrusion 110.

Figure 5A:
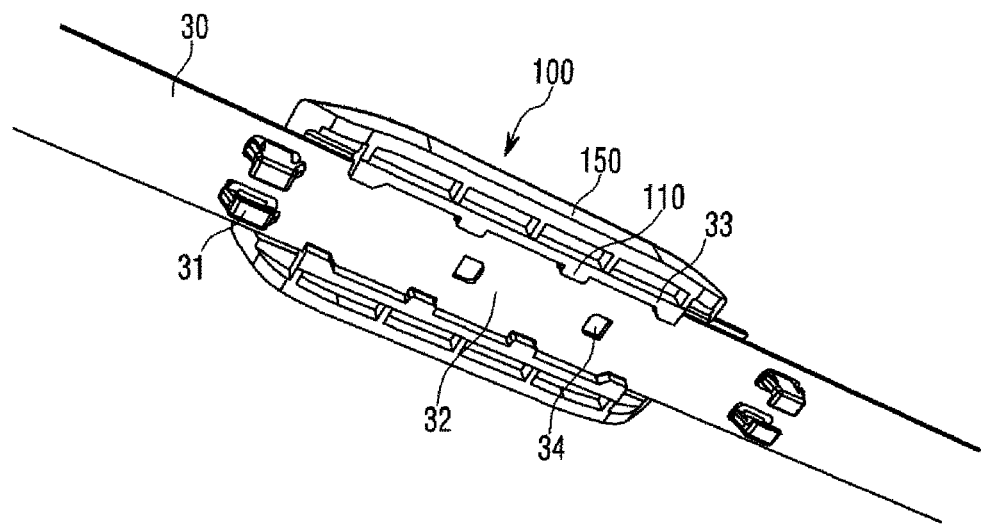
FIGS. 5a and 5b are bottom views showing a coupling structure between the frame and the seating part of the flat wiper blade according to the embodiment of the present invention.
Figure 5B:
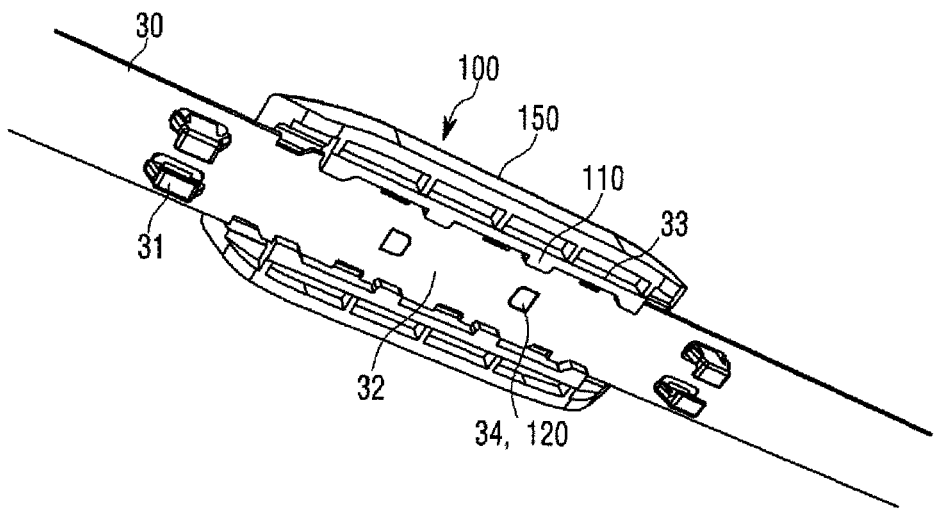

FIGS. 5a and 5b are bottom views showing the frame and the seating part. FIG. 5a shows that the fitting recess and the fitting protrusion are disposed to be engaged with each other so as to insert and fix the seating part into the frame. FIG. 5b shows that the frame and the seating part are completely coupled to each other.

A coupling structure between the frame 30 and the seating part 100 will be described with reference to FIGS. 2, 5a and 5b.

As shown in FIGS. 2 and 5a, first, the fitting protrusion 110 of the seating part 100 is inserted and fixed into the fitting recess 33 of the frame 30. In a state where the fitting protrusion 110 is disposed in each fitting recess 33, when the frame 30 is pressed toward the seating part 100 or when the seating part 100 is pressed toward the frame 30, the frame 30 comes in close contact with the bottom surface of the seating part 100. When the frame 30 comes in close contact with the bottom surface of the seating part 100, the frame 30 becomes movable in a sliding manner in the longitudinal direction of the wiper blade 2. Here, since the frame 30 comes in close contact with the bottom surface of the seating part 100, the end of the elastic catcher 120 is pushed upward by the contact surface of the frame 30 and then is elastically transformed upward. Accordingly, the elastic catcher 120 has downward elasticity. In this state, the frame 30 and the seating part 100 slide in an opposite direction to each other in the longitudinal direction of the wiper blade, and then are coupled to each other.

As shown in FIGS. 2 and 5b, in a state where the frame 30 and the seating part 100 come in close contact with each other, when the frame 30 moves forward and the seating part 100 moves backward in a sliding way, the elastic catcher 120 is elastically caught by the catching hole 34 of the frame 30. Therefore, the forward and backward movements of the frame 30 and the seating part 100 are restricted in the longitudinal direction of the wiper blade 2. In accordance with the shapes of the fitting recess 33 and the fitting protrusion 110, the frame 30 may move backward and the seating part 100 may move forward in a sliding manner.

Meanwhile, in a state where the catching hole 34 of the frame 30 is elastically caught by the elastic catcher 120 of the seating part 100, the fitting protrusion 110 is located on the side having no fitting recess formed therein of the frame 30. Therefore, the up and down movements of the seating part 100 is restricted, that is to say, the movement of the seating part 100 is restricted in a direction perpendicular to the longitudinal direction of the wiper blade 2.

Due to a first coupling of the catching hole 34 and the elastic catcher 120 and a second coupling of the fitting recess 33 and the fitting protrusion 110, the seating part 100 is coupled to the frame 30. Through the first and the second couplings, the seating part 100 is more securely coupled to the frame 30.

The seating part 100 is separated from the frame 30 by pressing the bottom surface of a pair of the caught elastic catchers 120 and by sliding the seating part 100 and the frame 30.

Meanwhile, the first and the second spoilers 41 and 42 are coupled to the first and the second sides 35 and 36 of the frame 30. There is no limit to a method of coupling the first and the second spoilers 41 and 42 to the first and the second sides 35 and 36.

Since it can be considered that the coupling may be performed by publicly known arts, a detailed description thereof will be omitted.

When the first and the second spoilers 41 and 42 are coupled to the frame 30 after the seating part 100 is coupled to the frame 30, the front side spoiler 41 restricts the forward movement of the seating part 100, thereby preventing the separation of the seating part 100 from the frame 30.

Next, a coupling of the seating part 100 and the adaptor part 3 will be described.

Figure 6:
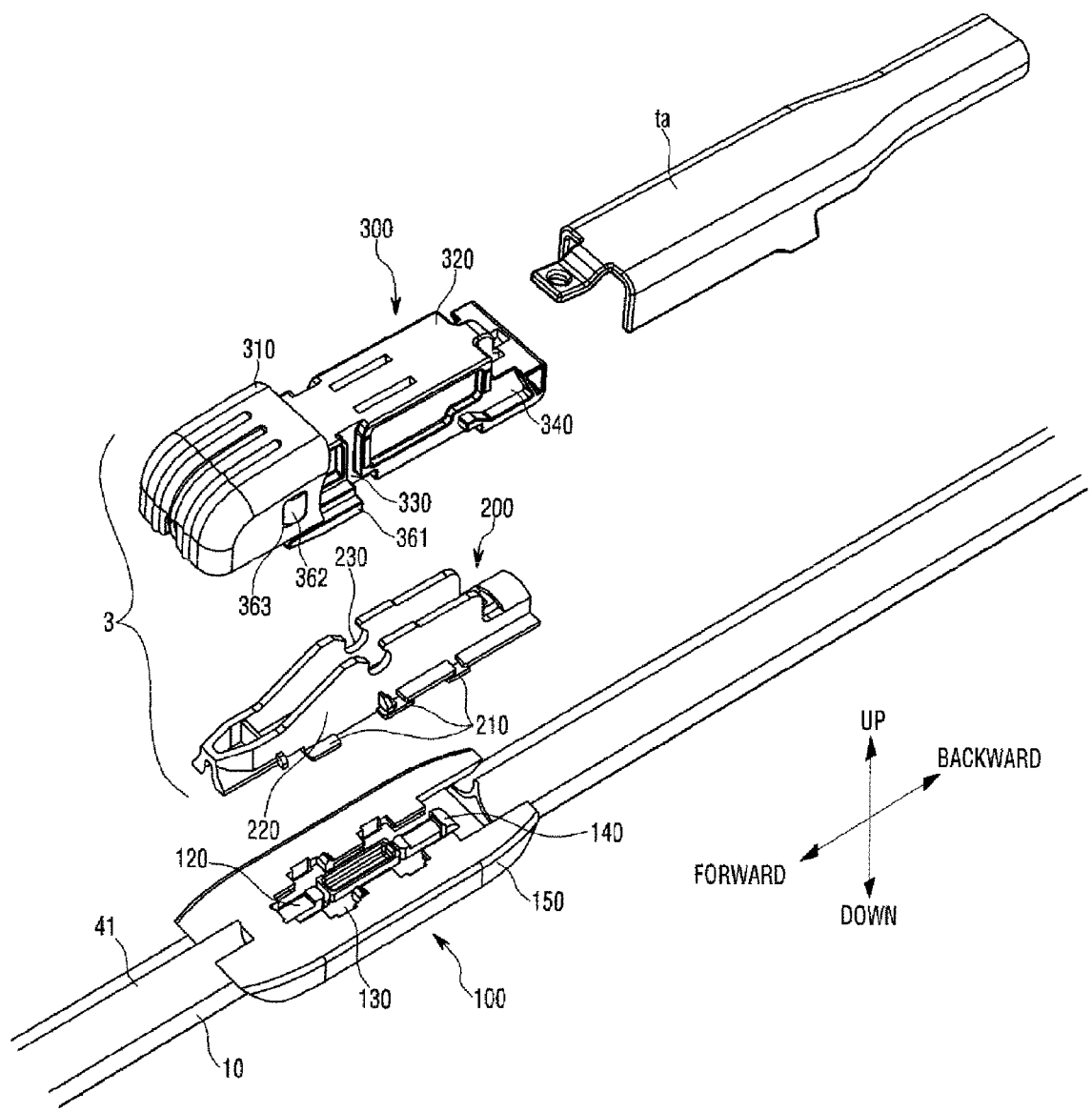
FIG. 6 is a perspective view showing that the flat wiper blade, an adaptor and a connector have been separated from each other according to the embodiment of the present invention.

FIG. 6 shows that the wiper blade, the adaptor and the connector have been separated from each other.

Figure 7A:
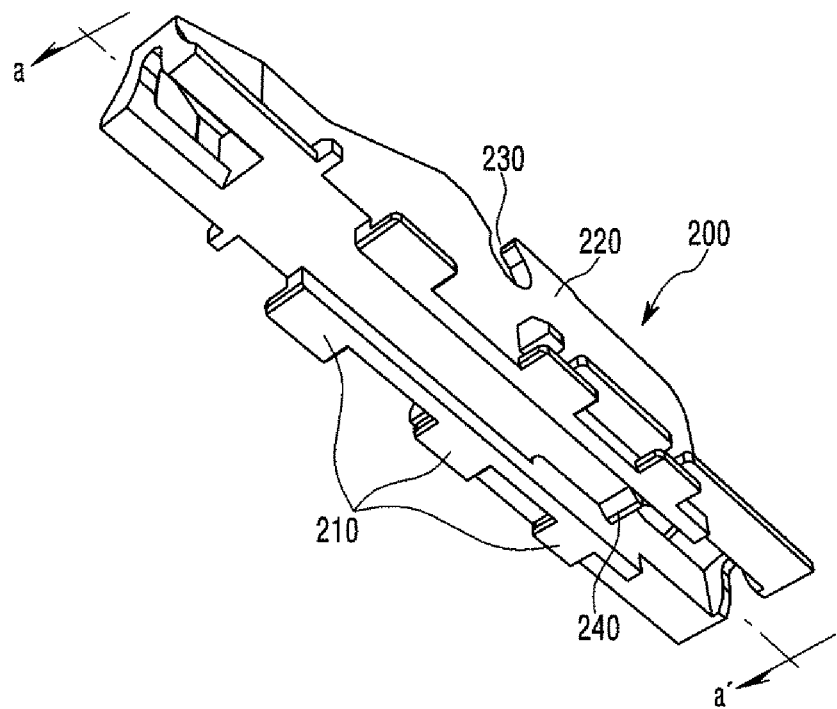
FIG. 7a is a bottom perspective view of the adaptor according to the embodiment of the present invention.
Figure 7B:
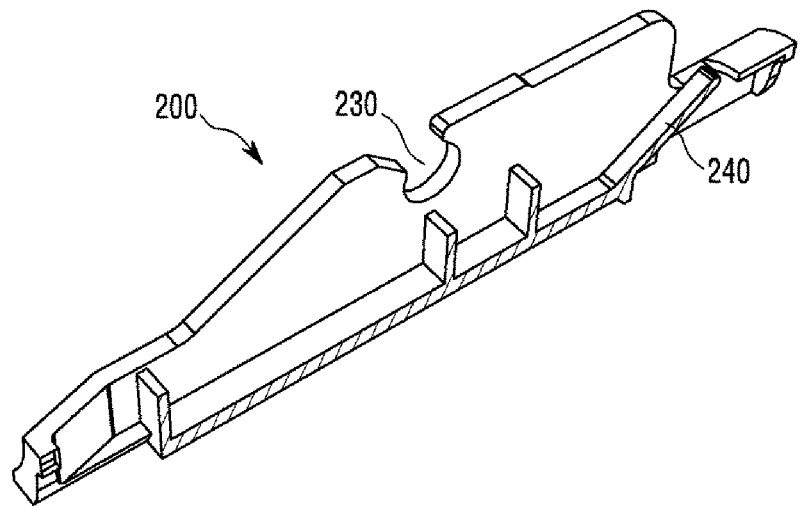
FIG. 7b shows a cross section formed by cutting the adaptor in the longitudinal direction of the wiper blade in accordance with the embodiment of the present invention.

FIG. 7a is a bottom perspective view of the adaptor shown in FIG. 6. FIG. 7b shows a cross section formed by cutting the adaptor in the longitudinal direction of the wiper blade.

Referring to FIGS. 1, 2 and 6, the flat wiper blade assembly 1 includes the flat wiper blade 2 and the adaptor part 3 comprised of the adaptor 200 and the connector 300. The flat wiper blade 2 contacts closely with the glass surface of the vehicle. The adaptor 200 is assembled to the middle portion of the wiper arm. The adaptor 200 and the connector 300 fix and support the end of the wiper arm.

In the embodiment of the present invention, though the adaptor part 3 is formed by coupling the separate adaptor 200 to the separate connector 300, there is no limit to this. The adaptor 200 and the connector 300 may be integrally formed therewith as one component.

As shown in FIGS. 6 to 7b, a catching recess 130 is formed in the upper portion of the seating part 100 in order to allow the seating part 100 to be coupled the adaptor 200. A catching protrusion 140 is formed in the rear portion of the seating part 100 in order to allow the seating part 100 to be coupled to and separated from the adaptor 200. A catching projection 210 is formed in the lower portion of the adaptor 200 in order to allow the adaptor 200 to be coupled to the seating part 100. Also, an adaptor catcher 240 which is caught by the catching protrusion 140 of the seating part 100 is formed in the adaptor 200. The catching projection 210 is formed to be inserted into the catching recess 130.

In the meantime, the upper portion of the adaptor 200 includes a pair of guide plates 220 formed projecting perpendicularly at a predetermined interval. A hinge recess 230 into which a later-mentioned hinge shaft 350 of the connecter 300 is inserted and fixed is formed in the upper central portion of the both guide plates 220.

Next, a coupling of the adaptor 200 and the seating part 100 coupled to the frame 30 will be described.

Referring to FIGS. 4 to 7b, after the catching projection 210 of the adaptor 200 is inserted into the catching recess 130 of the seating part 100, the adaptor 200 and the seating part 100 are moved in an opposite direction to each other. Then, an adaptor catcher 240 is caught by the catching protrusion 140 of the seating part 100, so that backward movement is restricted. The catching projection 210 of the adaptor 200 is caught by the top surface having no recess formed therein of the seating part 100 and then up and down movements of the adaptor 200 is restricted. After the adaptor catcher 240 is released from the catching protrusion 140 of the seating part 100 by lifting up the adaptor catcher 240, the adaptor 200 is moved backward and then is lifted upward, so that the adaptor 200 is separated from the seating part 100. Here, since the adaptor 200 is coupled to the seating part 100, the elastic catcher 120 of the seating part 100 is pressed downward by the adaptor 200. Therefore, the elastic catcher 120 cannot be separated from the catching hole 34 of the frame 30. Accordingly, the adaptor 200 must be necessarily separated in advance from the seating part 100 in order to separate the wiper blade 2 from the seating part 100. This coupling structure has an effect of preventing the seating part 100 from being separated from the wiper blade 2 when wiping is performed.

The catching projection 210 of the adaptor 200 has a shape to be coupled to the seating part 100 of the wiper blade 2. The shape of the upper portion of the adaptor 200 may be changed according to the connector 300 to be coupled. That is, the shape of the couplable connector 300 is changed according to the wiper arm, and the shape of the couplable adaptor is changed according to the connector 300. Therefore, the adaptor 200 having an upper portion shape which is changeable according to the shape of the wiper arm fastened to the wiper blade 2 is coupled to the seating part 100, so that various wiper arms can be coupled to one wiper blade 2. As a result, instead of the entire wiper blade 2, only the adaptor 200 and the connector 300 which correspond to the wiper arm are replaced, so that manufacturing cost can be reduced.

A user can couple the adaptor 200 to the seating part 100 by grasping the sides 150 of the seating part 100. Therefore, the user is able to couple the adaptor 200 by grasping the seating part 100 without necessity of directly grasping the frame 30 to which the wiper strip 10 has been coupled. When the adaptor 200 is directly coupled to the frame 30, the frame 30 having a curvature must be pressed in a reverse direction to the direction of the curvature thereof in order that the frame 30 has a straight line shape. However, in the flat wiper blade 2 according to the embodiment of the present invention, it is possible to directly couple the adaptor 200 to the seating part 100. Accordingly, the frame 30 is not excessively transformed, so that the lifespan of the wiper blade is increased and convenience for user is obtained.

Next, the connector 300 which is coupled to the adaptor 200 will be described.

Figure 8A:
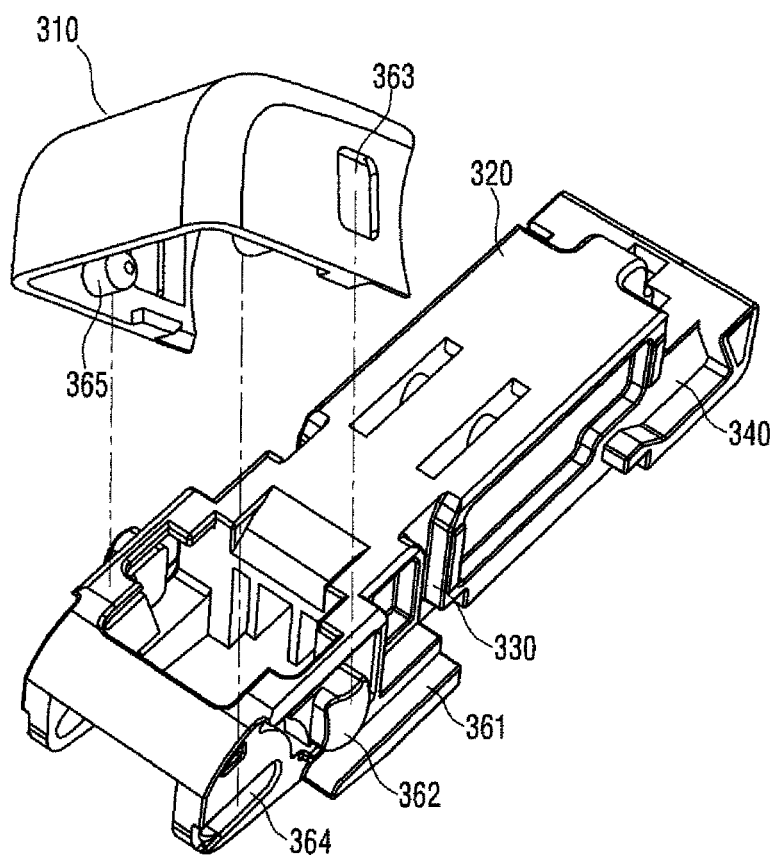
FIGS. 8a and 8b are a bottom view and a perspective view of the connector according to the embodiment of the present invention.
Figure 8B:
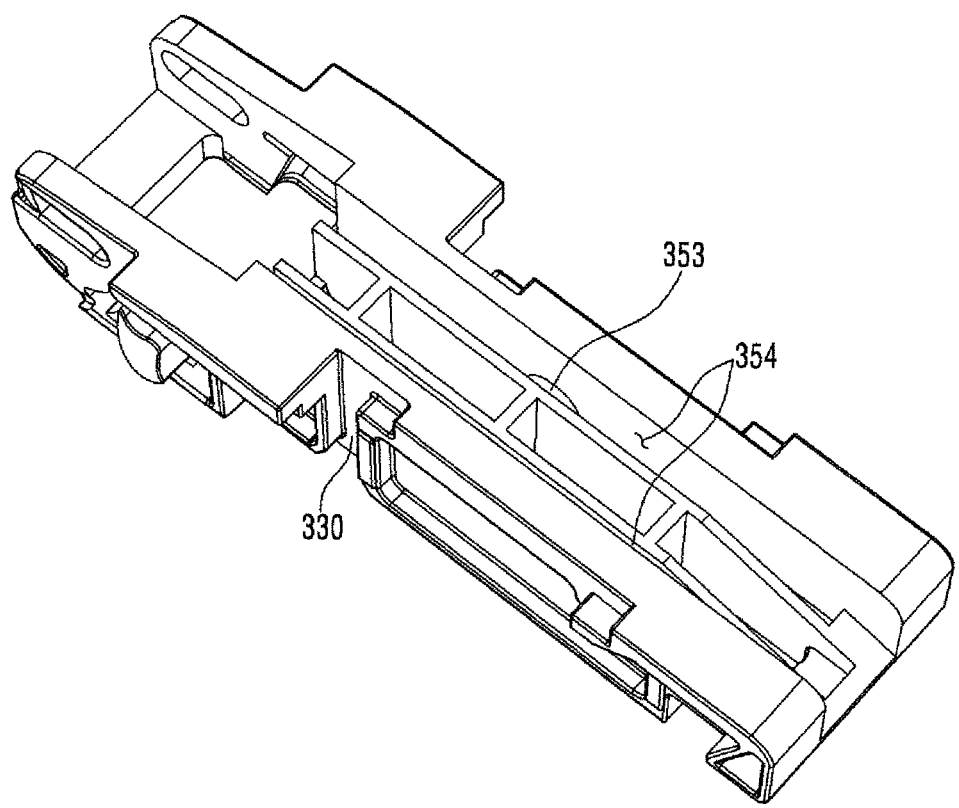

FIGS. 8a and 8b are an exploded perspective view and a bottom view of the connector which is coupled to the adaptor.

Referring to FIGS. 8a and 8b, the connector 300 includes a body 320 and a cover part 310. The lower portion of the connector 300 is opened to allow the connector be coupled to the adaptor 200. The lower portion of the body 320 includes a fitting part 353 allowing the connector 300 to be coupled to the adaptor 200. Also, as shown in FIG. 8b, the lower portion of the body 320 includes a pair of slit grooves 354 in which the guide plate 220 of the adaptor 200 is received. When the guide plate 220 of the adaptor 200 is received in the slit groove 354, the guide plate 220 contacts with four sides of a pair of the slit grooves 354. Therefore, the guide plate 220 slides on the four sides of a pair of the slit grooves 354. Accordingly, since the sliding area is increased and the lower space of the connector 300 is reduced, a gap caused by the wiping is reduced and the wiping is stably performed.

As shown in FIGS. 8a and 8b, the cover part 310 includes a pair of coupling protrusions 365 and a catching recess 363 allowing the cover part 310 to be coupled to the body 320. A pair of the coupling protrusions 365 is inserted and fixed to a coupling recess 364 formed in the body 320 and guides the forward and backward movements of the cover part 310. In order to attach or separate the wiper arm to or from the connector 300, the cover part 310 requires a horizontal straight linear movement guided by the coupling recess 364. Therefore, since the cover part 310 is not opened by the rotation moment of the wiper arm when the wiping is performed, the wiper arm can be prevented from being separated from the wiper blade. Also, since the cover part 310 is connected to the body 320, the cover part 310 is less expected to be lost. The coupling protrusion 365 functions as a rotation axis when the cover part 310 rotates.

The body 320 may include a guide part 361 for guiding a front and back of the cover part 310, the coupling recess 364 to which the coupling protrusion 365 of the cover part 310 is coupled, and an elastic catching piece 362 which is elastically coupled to the catching recess 363.

The hinge shaft 350 which is received in the hinge recess 230 of the adaptor 200 and mounts the connector 300 to the adaptor 200 is formed within the lower portion of the connector 300. The adaptor 200 may be formed of a resin material. The hinge recess 230 elastically receives the hinge shaft 350 of the connector 300, thereby preventing the connector 300 from being separated from the adaptor 200.

Next, a process in which the wiper arm is coupled to the connector 300 will be described.

Figure 9A:
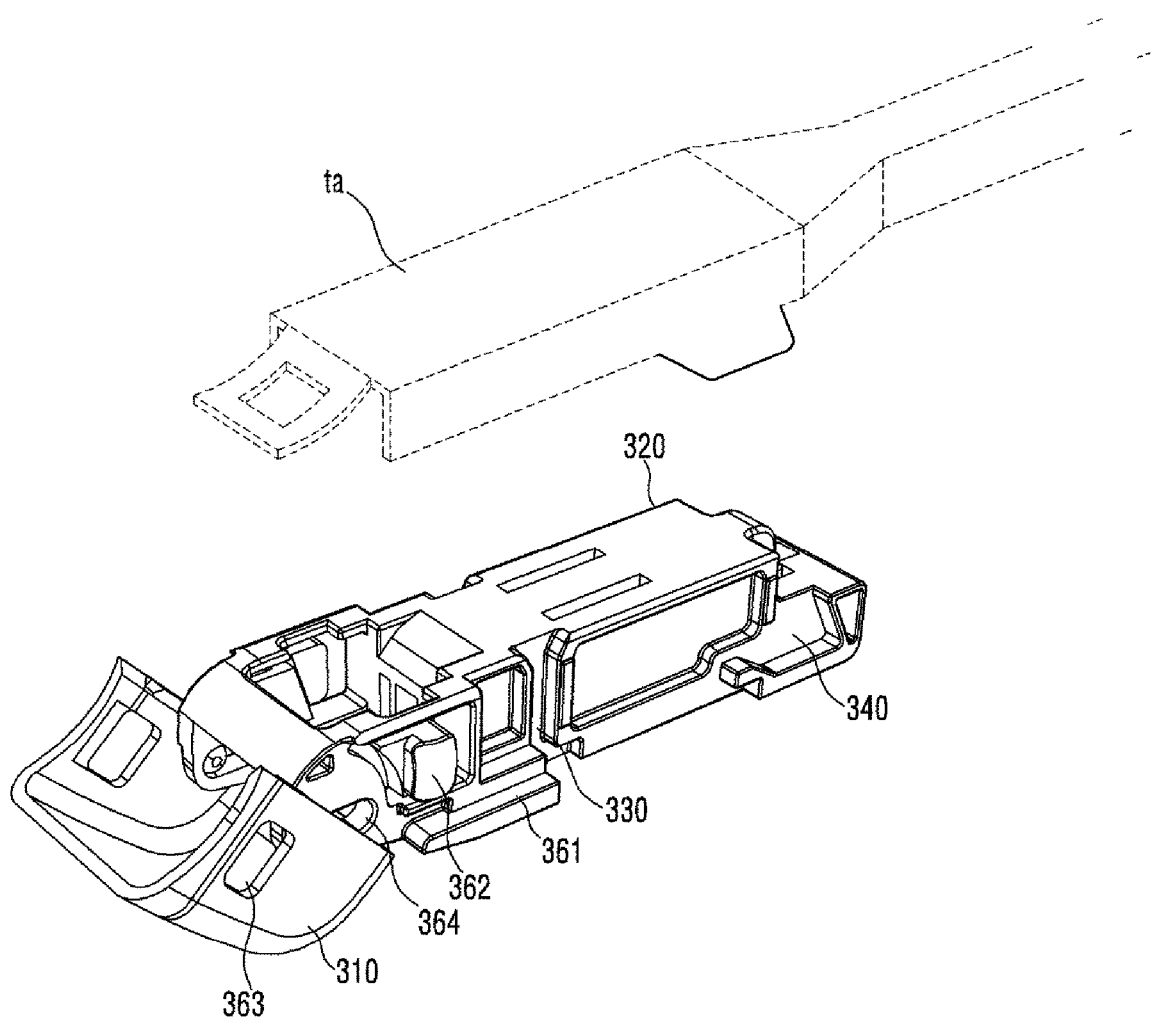
FIGS. 9a and 9b are perspective views showing how a wiper arm is coupled to the connector according to the embodiment of the present invention.
Figure 9B:
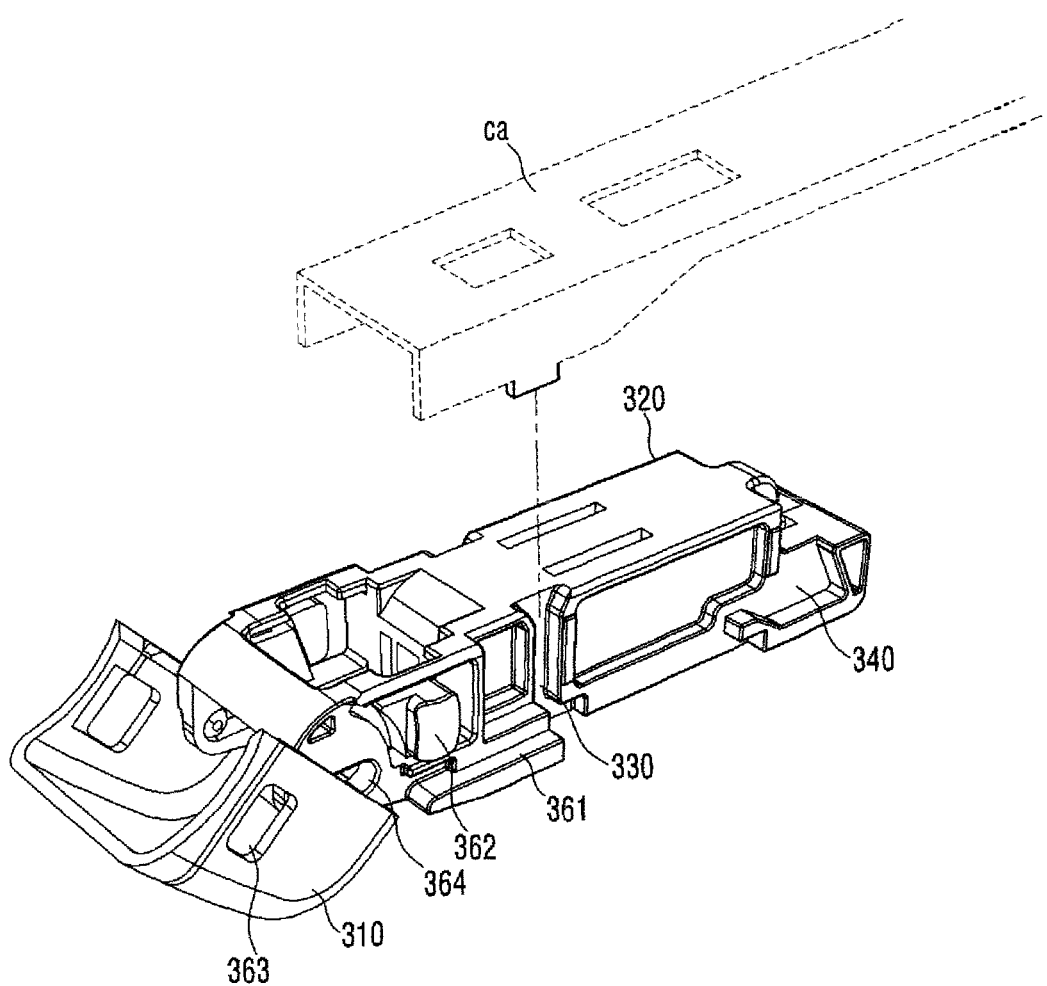

FIGS. 9a and 9b show that the connecter is coupled to various wiper arms.

As shown in FIG. 9a, a wiper arm (ta) including a tap which contacts with the top surface and both sides of the connector 300 and extends toward the cover part 310 may be selectively connected to the connector 300. Or, as shown in FIG. 9b, a wiper arm (ca) including a cap which contacts with the top surface and both sides of the connector 300 may be selectively connected to the connector 300.

As shown in FIGS. 9a and 9b, in a case where the wiper arm is coupled to the connector 300, when the wiper arm is coupled to and supported by a first coupling part 330 or a second coupling part 340 which has been formed in the side of the connector 300, the cover part 310 of the connector 300 slides toward the rear of the connector 300 along the guide part 361, and the elastic catching piece 362 formed in the side of the body 320 of the connector 300 is coupled to the catching recess 363 formed in the side of the cover part 310 and protrudes outwardly from the catching recess 363. As a result, the wiper arm is restricted from moving forward, backward and upward. A pair of the elastic catching pieces 362 and a pair of the catching recesses 363 may be formed on both sides of the connector 300 or the elastic catching piece 362 and the catching recess 363 may be formed only on one side of the connector 300.

Next, a process of separating the wiper arm from the wiper blade assembly will be described.

Referring to FIGS. 6, 8a to 9b, when the right and left of the elastic catching piece 362 protruding from the catching recess 363 of the cover part 310 are pressed and the elastic catching piece 362 is released from the catching recess 363, the cover part 310 of the connector 300 slides toward the front of the guide part 361. After the cover part 310 slides to the end of the guide part 361, the cover part 310 is rotatable at an angle of greater than 90 degree downward from the front of the connector 300. When the cover part 310 of the connector 300 rotates about the coupling protrusion 365 formed in the cover part 310, the wiper arm can be separated from the first coupling part 330 or the second coupling part 340.

As such, when the cover part 310 restricts or releases the wiper arm, the straight line movement and rotational movement are necessary. Accordingly, in this case, it is possible to obtain more excellent space utilization than that when the cover part 310 moves forward and backward. That is, since the opening becomes larger, it is easy to mount the wiper arm to the connector 300. Therefore, the connector 300 according to the embodiment of the present invention requires less space than a space required by the connector in a case where the cover part 310 moves along the straight line, so that the length of the adaptor 200 to which the connector is coupled may be shortened. Also, the length of the seating part 100 in which the adaptor 200 is formed may be shortened. Accordingly, the length of the spoiler of the wiper blade 2 can be increased, so that there is an effect of preventing lifting and chattering caused by traveling wind of the vehicle. Further, the guide part 361 prevents the cover part 310 from being opened by the rotation moment of the wiper arm when the wiping is performed, thereby preventing the wiper arm from being separated from the wiper blade.

Next, a second embodiment of the present invention will be described.

Second Embodiment

Figure 10:
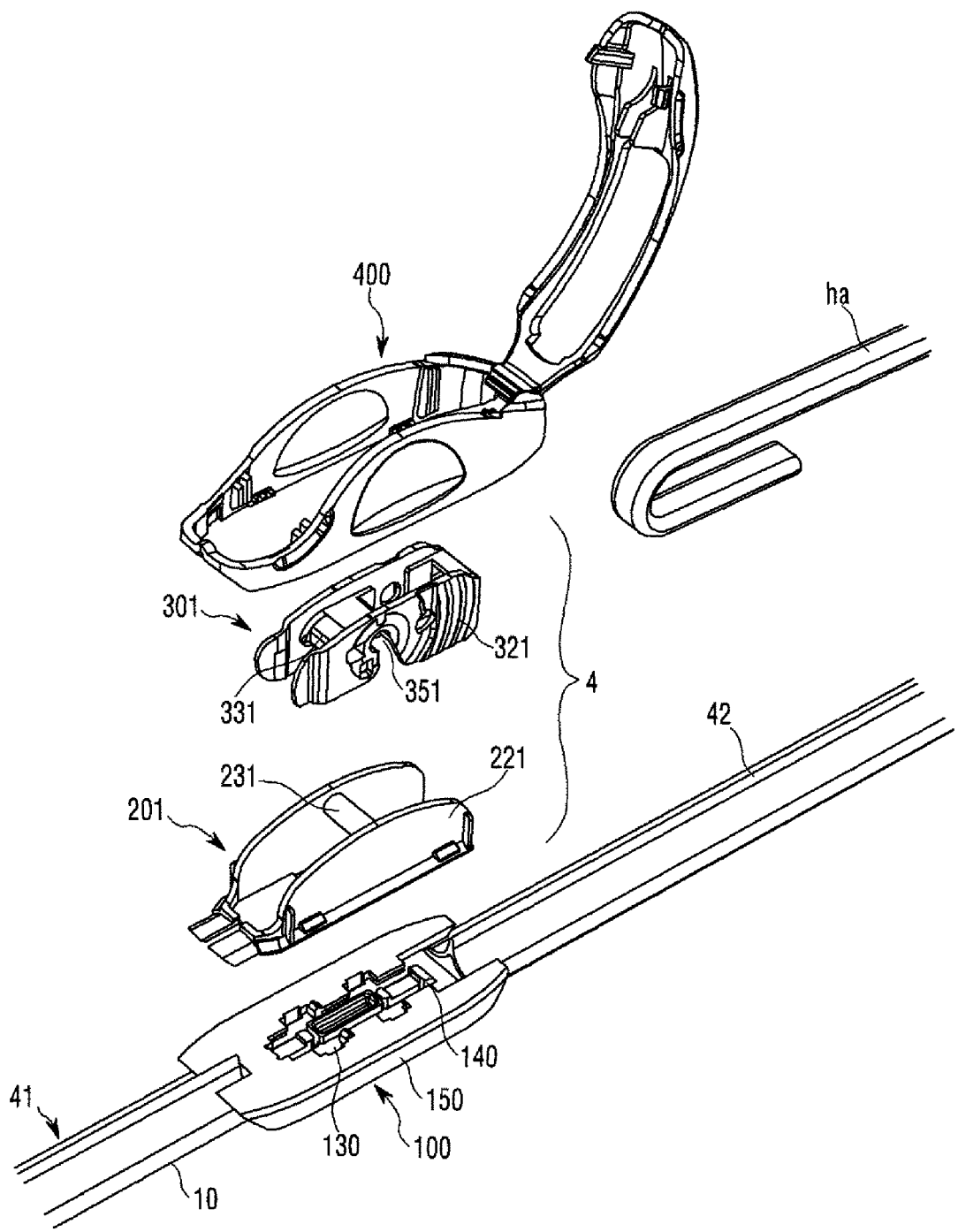
FIG. 10 is an exploded perspective view of a flat wiper blade assembly according to another embodiment of the present invention.
Figure 11:
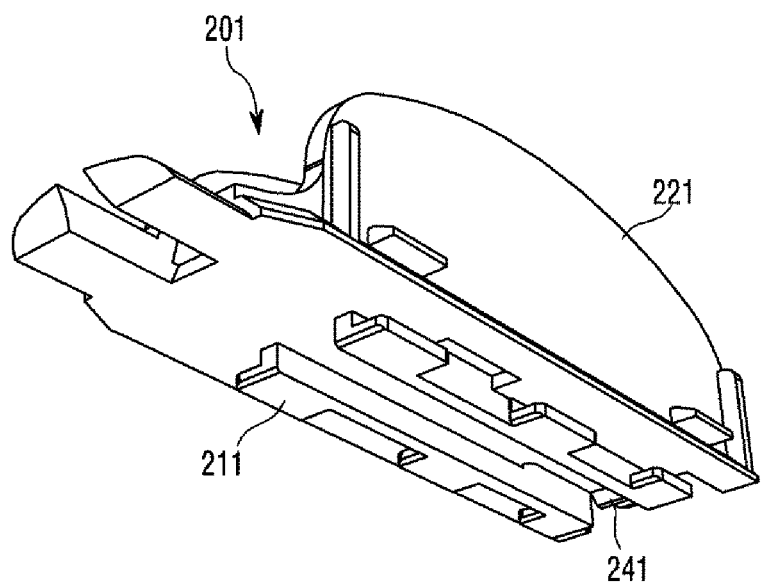
FIG. 11 is a perspective view of an adaptor of a flat wiper blade according to another embodiment of the present invention.

FIG. 10 shows another embodiment of a flat wiper blade assembly according to the present invention. FIG. 11 is a bottom perspective view of an adaptor shown in FIG. 10.

Referring to FIGS. 2 and 10, the flat wiper blade assembly according to the second embodiment of the present invention includes the flat wiper blade 2 and an adaptor part 4. The flat wiper blade 2 includes the wiper strip 10, the frame 30, the first and the second spoilers 41 and 42, and seating part 100. The adaptor part 4 includes an adaptor 201 and a connector 301.

As shown in FIG. 10, since a configuration of such a flat wiper blade assembly is almost the same as that of the above-described embodiment, a detailed description thereof will be omitted. Meanwhile, the flat wiper blade 2 can be applied to both the above-described embodiment and this embodiment. Accordingly, a unit component can be standardized.

As shown in FIGS. 2, 10 and 11, in the same way as the above-described embodiment, a catching projection 211 is formed in the lower portion of the adaptor 201 in order to allow the adaptor 201 to be coupled to the seating part 100. Also, an adaptor catcher 241 which is caught by the catching protrusion 140 of the seating part 100 is formed in the adaptor 201. Here, the catching projection 211 is formed to be inserted into the catching recess 130.

The upper portion of the adaptor 201 includes a pair of outer side plates 221 formed projecting perpendicularly at a predetermined interval. The central portions of the outer side plates 221 are connected to each other by a hinge shaft 231. The hinge shaft 231 is inserted and fixed into a hinge recess 351 to be described later of the connector 301.

The embodiment-based coupling structure between the adaptor 201 and the seating part 100 is the same as that of the above-described embodiment. That is, the catching projection 211 of the adaptor 201 is inserted into the catching recess 130 of the seating part 100, and then the seating part 100 and the adaptor 201 slide in an opposite direction to each other in the longitudinal direction thereof. Then, an adaptor catcher 241 is caught by the catching protrusion 140 of the seating part 100, so that backward movement is restricted. As a result, the adaptor 201 and the seating part 100 are coupled to each other.

After the adaptor catcher 241 is released from the catching protrusion 140 of the seating part 100 by lifting up the adaptor catcher 241, the adaptor 201 is moved backward and then is lifted upward, so that the adaptor 201 is separated from the seating part 100. Also, since the adaptor 201 is coupled to the seating part 100, the seating part 100 is not separated from the frame 30. Therefore, the seating part 100 is prevented from being separated from the wiper blade 2 when wiping is performed. Since this is the same as the above-described embodiment, a detailed description thereof will be omitted.

In the meantime, the connector 301 is inserted between the outer side plates 221 of the adaptor 201 and is pivoted. The connector 301 includes a pair of inner side plates 321 contacting with the outer side plate 221, and the hinge recess 351 formed in the central portion of the inner side plate 321. The connector 301 also includes a curved surface 331 formed in a portion of a connection portion which surrounds the hinge recess 351 and connects the inner side plates 321. The wiper arm having a 'U'-shaped clip formed therein is selectively caught by the curved surface 331. The 'U'-shaped clip has a straight portion and a curved portion which is formed on the end of the wiper arm and extends from the straight portion.

A cover 400 may be additionally coupled to the adaptor part 4. The cover 400 is able to improve the appearance of the adaptor part 400 and prevent foreign substances from being introduced into the adaptor part 4.

Figure 12:
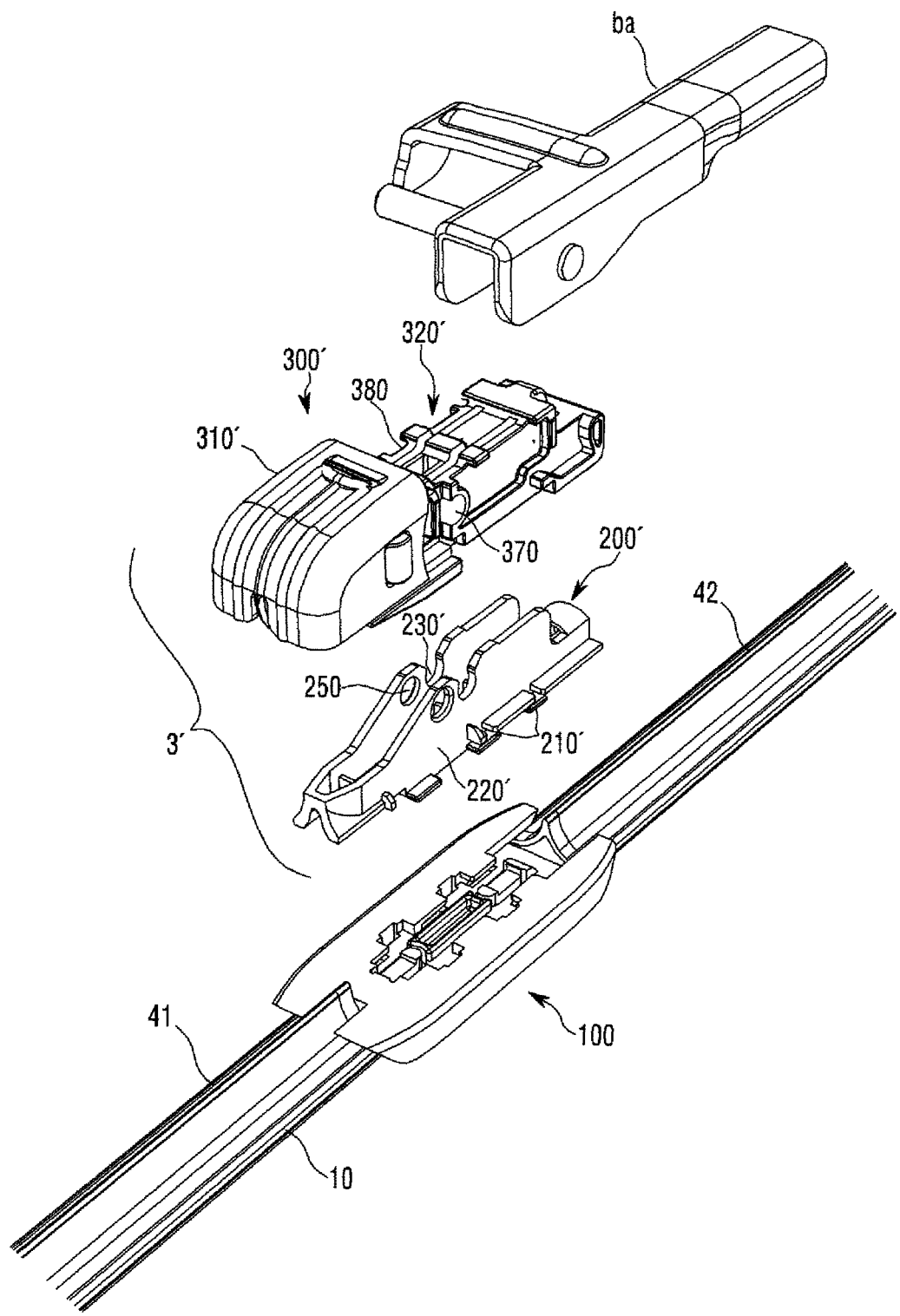
FIG. 12 is an exploded perspective view of a flat wiper blade assembly according to further another embodiment of the present invention.
Figure 13:
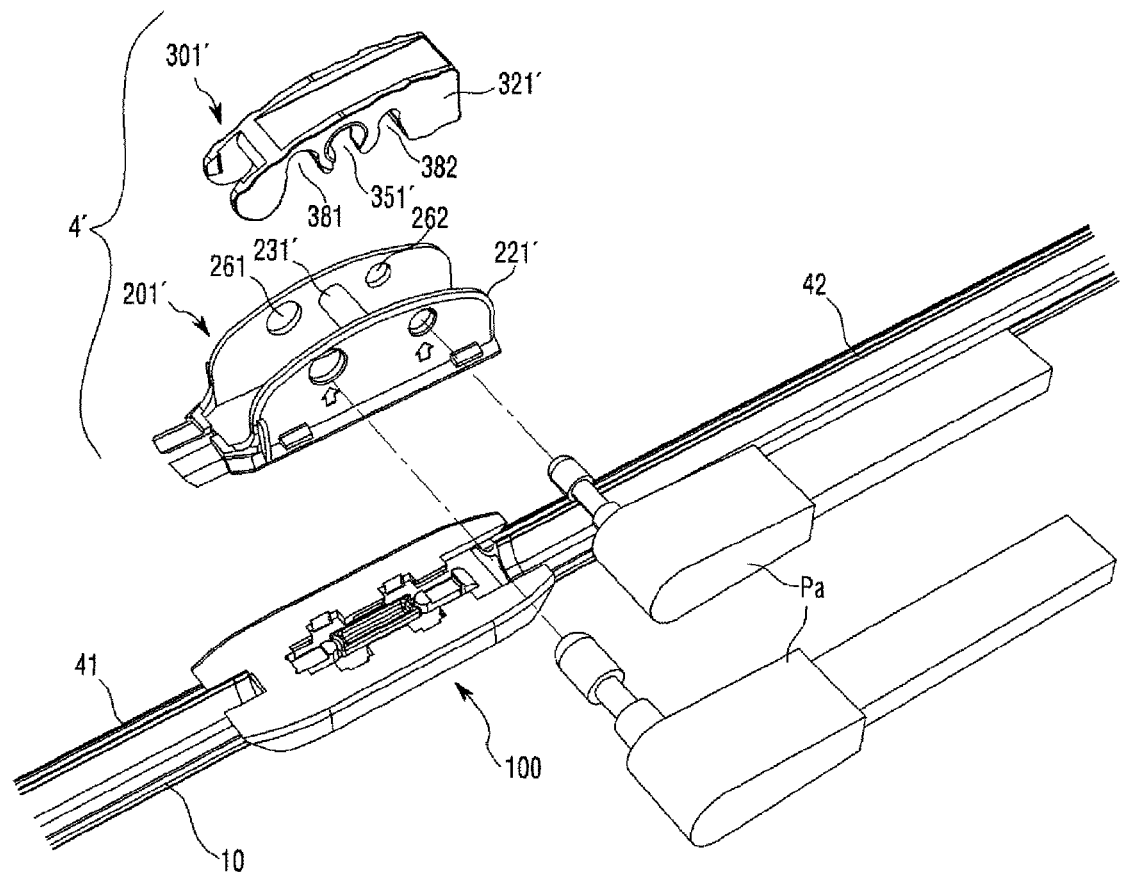
FIG. 13 is an exploded perspective view of a flat wiper blade assembly according to yet another embodiment of the present invention.

FIGS. 12 and 13 show further another embodiment of the flat wiper blade assembly according to the present invention.

FIG. 12 shows a wiper blade assembly to which a side-lock type wiper arm (ba) is coupled in a side direction. The wiper arm (ba) includes a side pin and a hook, both of which allow the wiper arm (ba) to be coupled to the wiper blade assembly in the side direction.

Referring to FIG. 12, the wiper blade assembly according to the embodiment includes the flat wiper blade 2 and an adaptor part 3'. The flat wiper blade 2 includes the wiper strip 10, the frame 30, the first and the second spoilers 41 and 42, and seating part 100. The adaptor part 3' includes an adaptor 200' and a connector 300'.

As shown in FIGS. 1, 6 and 12, since the configuration of the wiper blade 2 is the same as that of the first embodiment, a detailed description thereof will be omitted.

Since the shape of the lower portion of the adaptor 200' is the same as that of the adaptor 200 described in the first embodiment, the adaptor 200' is coupled to or separated from the seating part 100 in the same manner as that of the first embodiment. The upper portion of a guide plate 220' includes a pinhole 250 formed therein to which the wiper arm (ba) having a pin projecting in the side direction is coupled. A hinge recess 230' into which a later-mentioned hinge shaft (not shown) of the connector 300' is inserted and fixed is formed in the upper central portion of the both guide plates 220'.

The connector 300' includes a body 320' and a cover part 310'. Since the configuration of the cover part 310' and a coupling structure between the cover part 310' and the body 320' are the same as those of the first embodiment, a detailed description will be omitted.

The body 320' includes a pin coupling recess 370 formed therein into which the side pin of the wiper arm (ba) is inserted and fixed in the width direction of the wiper blade. A hook recess 380 to which the hook of the wiper arm (ba) is fitted and coupled is formed in the top surface of the body 320'. The formation position of the pin coupling recess 370 of the body 320' contacts with the pinhole 250 of the adaptor 200'.

FIG. 13 shows a wiper blade assembly to which a pinhole type wiper arm is coupled in a side direction.

Referring to FIG. 13, the wiper blade assembly according to the embodiment includes the flat wiper blade 2 and an adaptor part 4'. The flat wiper blade 2 includes the wiper strip 10, the frame 30, the first and the second spoilers 41 and 42, and seating part 100. The adaptor part 4' includes an adaptor 201' and a connector 301'.

As shown in FIGS. 10 and 13, since the configuration of the wiper blade 2 is the same as that of the second embodiment, a detailed description thereof will be omitted.

Since the shape of the lower portion of the adaptor 201' is the same as that of the adaptor 201 described in the second embodiment, the adaptor 201' is coupled to or separated from the seating part 100 in the same manner as that of the second embodiment. The upper portion of an outer side plate 221' includes a first pinhole 261 and a second pinhole 262 formed therein to which a wiper arm (pa) of which the end has a pin projecting in the side direction is coupled. The first pinhole 261 and the second pinhole 262 may have mutually different sizes such that they are selectively coupled according to the size of the wiper arm (pa). The central portions of the outer side plates 221' are connected to each other by a hinge shaft 231'. The hinge shaft 231' is inserted and fixed into a hinge recess 351' to be described later of the connector 301'.

The connector 301' is generally similar to the connector 301 of the second embodiment. A first pin coupling recess 381 and a second pin coupling recess 382, both of which have open bottoms, are formed such that a pin of the wiper arm (pa) passes through an inner side plate 321' contacting with the outer side plate 221'. The first pin coupling recess 381 contacts with the first pinhole 261 and the second pin coupling recess 382 contacts with the second pinhole 262.

In summary, the embodiment of the present invention includes the seating part 100 which is attachable to and separable from the flat wiper blade 2. The adaptor parts 3, 3', 4 and 4' may be coupled to the seating part 100 in accordance with the wiper arm. The adaptor parts 3, 3', 4 and 4' may include the adaptors 200, 200', 201 and 201' and the connectors 300, 300', 301 and 301' respectively. The adaptors 200, 200', 201 and 201' and the connectors 300, 300', 301 and 301' may be respectively integrally formed with each other.

A user can couple the adaptors 200, 200', 201 and 201' to the seating part 100 by grasping the sides 150 of the seating part 100. Therefore, the user is able to perform works such as replacement, repair or the like by grasping the seating part 100 without necessity of directly grasping the frame 30 to which the wiper strip 10 has been coupled. When the adaptors 200, 200', 201 and 201' are directly coupled to the frame 30, the frame 30 having a curvature must have a straight line shape. However, in the flat wiper blade 2 according to the embodiment of the present invention, it is possible to directly couple the adaptors 200, 200', 201 and 201' to the seating part 100. Accordingly, convenience for user is obtained. Through the coupling of the seating part 100 and the adaptors 200, 200', 201 and 201', the seating part 100 is prevented from being separated from the frame 30, and then there is an effect of preventing the wiper blade 2 from being separated when wiping is performed. As a result, stability of the wiping can be improved.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A flat wiper blade comprising:
a wiper strip which wipes a wiping surface;
a frame which supports the wiper strip and comprises at least two catching holes formed therein at a predetermined interval, each catching hole having a closed circumference, and a fitting recess that is concave in the widthwise direction of the wiper blade and is formed at a predetermined location of a longitudinal side of the frame;
a first and a second spoilers which are coupled to the frame; and
a seating part comprising a fitting protrusion and elastic catchers which are inserted and fitted into respective catching holes, wherein the fitting protrusion is coupled to adaptor parts which are coupled to a wiper arm, and wherein the fitting protrusion is coupled to the frame in an attachable and removable manner and is inserted and fitted into the fitting recess of the frame,
wherein, when the frame comes in contact with the seating part in a state where the fitting protrusion is inserted and fitted into the fitting recess, an end of the elastic catcher is elastically deformed upward, and
wherein, when either the seating part or the frame moves in a longitudinal direction of the flat wiper blade so that the fitting protrusion is located on a part of the longitudinal side without the fitting recess, the elastic catchers are elastically caught by the catching holes.

2. The flat wiper blade of claim 1, wherein the seating part further comprises a side surrounding both sides of a portion of the frame.

3. The flat wiper blade of claim 1, wherein the adaptor parts comprise catching projections and adaptor catchers, and wherein the seating part comprises a catching recess to which the catching projections of the adaptor parts are inserted and fitted and a catching protrusion by which the catchers are caught.

4. The flat wiper blade of claim 3, wherein the catching projections are inserted and fitted to the catching recess, and wherein the seating part and the adaptor parts slide in an opposite direction to each other in the longitudinal direction of the wiper blade, and then the adaptor catchers are caught by the catching protrusion, so that the adaptor part and the seating part are coupled to each other.

5. A flat wiper blade assembly comprising:
a flat wiper blade comprising:
a wiper strip which wipes a wiping surface;
a frame which supports the wiper strip and comprises at least two catching holes formed therein at a predetermined interval, each catching hole having a closed circumference, and a fitting recess that is concave in the widthwise direction of the wiper blade and is formed at a predetermined location of a longitudinal side of the frame;
a first and a second spoilers which are coupled to the frame; and
a seating part to which adaptor parts coupled to a wiper arm are coupled and which is coupled to the frame in an attachable and removable manner, the seating part comprising a fitting protrusion and elastic catchers which are inserted and fitted into respective catching holes, wherein the fitting protrusion is coupled to adaptor parts which are coupled to a wiper arm, and wherein the fitting protrusion is coupled to the frame in an attachable and removable manner and is inserted and fitted into the fitting recess of the frame; and
wherein, when the frame comes in contact with the seating part in a state where the fitting protrusion is inserted and fitted into the fitting recess, an end of the elastic catcher is elastically deformed upward, and
wherein, when either the seating part or the frame slides in a longitudinal direction of the flat wiper blade so that the fitting protrusion is located on a part of the longitudinal side without the fitting recess, the elastic catchers are elastically caught by the catching holes;
the adaptor part comprising:
an adaptor coupled to the seating part; and
a connector coupled to the adaptor and fastens the wiper arm to the wiper blade,
wherein the adaptor comprises:
a catching projection which is formed in the lower portion of the adaptor and is inserted and fixed into the seating part;
a pair of guide plates which is formed in the upper portion of the adaptor and projects perpendicularly at a predetermined interval; and
a hinge recess which is formed in the upper portion of the guide plate, and
wherein the connector comprises:
a body which comprises:
coupling parts which are formed on both sides of the body and receive a catching protrusion of the wiper arm; and
a hinge shaft which is formed in the lower portion of the body and is inserted and fixed to the hinge recess of the adaptor; and
a cover part which restricts forward and backward movements or up and down movements of the wiper arm.

6. The flat wiper blade assembly of claim 5, wherein the adaptor further comprises an adaptor catcher preventing the adaptor from being separated from the seating part, and wherein the seating part comprises a catching recess to which the catching projection of the adaptor is inserted and fitted and a catching protrusion by which the adaptor catcher is caught.

7. The flat wiper blade assembly of claim 6, wherein the catching projection is inserted and fitted to the catching recess, and wherein the seating part and the adaptor slide in an opposite direction to each other in the longitudinal direction of the wiper blade, and then the adaptor catcher is caught by the catching protrusion, so that the adaptor and the seating part are coupled to each other.

8. The flat wiper blade assembly of claim 5, wherein the cover part comprises at least one catching recess formed in a side thereof, and wherein the body further comprises at least one elastic catching piece which is coupled to the catching recess.

9. The flat wiper blade assembly of claim 5, wherein the body further comprises a guide part guiding a straight line movement of the cover part.

10. The flat wiper blade assembly of claim 5, wherein the body further comprises a coupling recess which is formed in a side thereof and to which the cover part is coupled, wherein the cover part further comprises a pair of coupling protrusions formed therein, and wherein the coupling protrusion is coupled to the coupling recess, guides a straight line movement of the cover part and functions as a rotation axis when the cover part rotates.

11. The flat wiper blade assembly of claim 5, wherein the body further comprises a pair of slit grooves formed in a lower portion thereof.

12. The flat wiper blade assembly of claim 5, wherein the connector is connected to a wiper arm including a tap which contacts with the top surface and both sides of the connector and extends toward the cover part, or is connected to a wiper arm including a cap which contacts with the top surface and both sides of the connector.

13. A flat wiper blade assembly comprising:
a flat wiper blade comprising:
   a wiper strip which wipes a wiping surface;
   a frame which supports the wiper strip and comprises at least two catching holes formed therein at a predetermined interval, each catching hole having a closed circumference, and a fitting recess that is concave in the widthwise direction of the wiper blade and is formed at a predetermined location of a longitudinal side of the frame;
   a first and a second spoilers which are coupled to the frame; and
   a seating part comprising a fitting protrusion and elastic catchers which are inserted and fitted into respective catching holes, wherein the fitting protrusion is coupled to adaptor parts which are coupled to a wiper arm, and wherein the fitting protrusion is coupled to the frame in an attachable and removable manner and is inserted and fitted into the fitting recess of the frame,
   wherein, when the frame comes in contact with the seating part in a state where the fitting protrusion is inserted and fitted into the fitting recess, an end of the elastic catcher is elastically deformed upward, and
   wherein, when either the seating part or the frame slides in a longitudinal direction of the flat wiper blade so that the fitting protrusion is located on a part of the longitudinal side without the fitting recess, the elastic catchers are elastically caught by the catching holes; and
the adaptor part comprising:
   an adaptor coupled to the seating part; and
   a connector coupled to the adaptor and fastens the wiper arm to the wiper blade,
   wherein the adaptor comprises:
      a catching projection which is formed in the lower portion of the adaptor and is inserted and fixed into the seating part;
      a pair of outer side plates which is formed in the upper portion of the adaptor and projects horizontally at a predetermined interval; and
      a hinge shaft which connects the central portions of the outer side plates,
   wherein the connector comprises:
      a pair of inner side plates which contacts with the pair of outer side plates;
      a hinge recess which is formed in the central portion of the inner side plate and to which the hinge shaft is inserted and fixed; and
      a curved surface by which a wiper arm having a straight portion and a curved portion which is formed on an end of the wiper arm and extends from the straight portion is selectively caught, and
   wherein the connector is inserted between the outer side plates of the adaptor and is pivoted.

14. The flat wiper blade assembly of claim 13, wherein the adaptor further comprises an adaptor catcher preventing the adaptor from being separated from the seating part, and wherein the seating part comprises a catching recess to which the catching projection of the adaptor is inserted and fitted and a catching protrusion by which the adaptor catcher is caught.

15. The flat wiper blade assembly of claim 14, wherein the catching projection is inserted and fitted to the catching recess, and wherein the seating part and the adaptor slide in an opposite direction to each other in the longitudinal direction of the wiper blade, and then the adaptor catcher is caught by the catching protrusion, so that the adaptor and the seating part are coupled to each other.

\* \* \* \* \*